US012482960B2

(12) United States Patent
Cieszynski et al.

(10) Patent No.: US 12,482,960 B2
(45) Date of Patent: Nov. 25, 2025

(54) ELECTRICAL CONNECTOR FOR CONNECTING HIGH VOLTAGE POWER CABLE INCLUDING ELECTRICAL CONDUCTOR TO ELECTRICAL TERMINAL

(71) Applicant: Aptiv Technologies AG, Schaffhausen (CH)

(72) Inventors: Michal Cieszynski, Cracow (PL); Tomasz Slizowski, Cracow (PL); Monika Pieszka-Lyson, Cracow (PL)

(73) Assignee: Aptiv Technologies AG, Schaffhausen (CH)

( * ) Notice: Subject to any disclaimer, the term of this patent is extended or adjusted under 35 U.S.C. 154(b) by 245 days.

(21) Appl. No.: 18/204,471

(22) Filed: Jun. 1, 2023

(65) Prior Publication Data

US 2023/0396003 A1 Dec. 7, 2023

(30) Foreign Application Priority Data

Jun. 3, 2022 (EP) .................................... 22177180

(51) Int. Cl.
*H01R 11/28* (2006.01)
*H01R 11/12* (2006.01)

(52) U.S. Cl.
CPC ........... *H01R 11/281* (2013.01); *H01R 11/12* (2013.01)

(58) Field of Classification Search
CPC .............................. H01R 11/281; H01R 11/12
USPC ....................................................... 439/485
See application file for complete search history.

(56) References Cited

U.S. PATENT DOCUMENTS

| 2011/0003517 A1 | 1/2011 | Akahori et al. |
| 2019/0252094 A1* | 8/2019 | Wienziers ............ H05K 7/2039 |
| 2023/0115409 A1* | 4/2023 | Kozak .................... H01B 7/425 |
| | | 174/15.6 |

FOREIGN PATENT DOCUMENTS

| CN | 209282445 U | 8/2019 |
| CN | 210430148 U | 4/2020 |
| DE | 102019117649 A1 | 1/2021 |
| EP | 3525269 A1 | 8/2019 |
| WO | 2019239263 A1 | 12/2019 |

OTHER PUBLICATIONS

Extended European Search Report for Application No. 22177180.1; mailed Nov. 28, 2022; 12 pages.

* cited by examiner

*Primary Examiner* — Tulsidas C Patel
*Assistant Examiner* — Jeffrey Mountain
(74) *Attorney, Agent, or Firm* — Billion & Armitage

(57) ABSTRACT

An electrical connector for connecting a high voltage power cable including an electrical conductor to an electrical terminal. The electrical connector includes a terminal connection portion and a conductor connection portion including a conductor interface surface. The connector further includes a conduit formed therein between an inlet opening and an outlet opening, the conduit defining a path for the circulation of a coolant through the connector, the conduit being configured to receive the coolant from a cooling system pipe. The connector includes a heat transfer surface configured to be in contact with the coolant circulating through the conduit for transferring heat from the connector to the coolant. The specification also provides a power cable assembly and a cooling system for coupling with a power cable assembly.

12 Claims, 11 Drawing Sheets

ELECTRICAL CONNECTOR FOR CONNECTING HIGH VOLTAGE POWER CABLE INCLUDING ELECTRICAL CONDUCTOR TO ELECTRICAL TERMINAL

CROSS-REFERENCE TO RELATED APPLICATION

This application claims benefit of priority to European Patent Application No. 22177180.1 filed on Jun. 3, 2022, the entire disclosure of which is hereby incorporated by reference.

TECHNICAL FIELD OF THE INVENTION

The present disclosure relates in general to high voltage power cables, and more particularly, to a power cable assembly configured for coupling to a cooling system and a power distribution system incorporating an integrated cooling system.

BACKGROUND

Charging of high voltage batteries, for example in the field of automotive technology, requires the use of heavy gauge high voltage (HV) power cables that can handle the level of current required to ensure fast charging. The HV power cables used in battery charging applications and/or power distribution applications are usually provided with a cooling system to ensure that the heat generated at the electrical conductor due to the high current flow is dissipated away, thereby increasing the efficiency and safety of the charging operation. In one existing approach of the prior art, passive cooling solutions may be applied to reduce the temperature dissipated by a HV power cable. However, passive cooling solutions, are limited due to manufacturing and weight constraints. For example, changing the dimensions of the components, e.g., increasing the gauge of the electrical conductor, to reduce temperature would increase the weight and cost of the power cable assembly, while reducing its mechanical flexibility.

Those portions that are actively conducting power within the assembly are susceptible to heating, such portions include a conductor of a power cable or a bus bar, and connectors that provide delivery of power to the conductor or bus bar. In a related application, new arrangements for a power cable assembly configured for coupling to a cooling system and a power distribution system incorporating an integrated cooling system. These advantageously provide for a direct cooling of the conductor. However, there is a need to provide a power cable assembly with improved cooling system that provides cooling at selected parts of the power distribution system, as required.

SUMMARY

It is an aim of the present disclosure to provide an improved connector and an improved power cable assembly including the connector. These arrangements are directed to addressing problems associated with existing devices and systems.

According to a first aspect, the specification provides an electrical connector for connecting a high voltage power cable including an electrical conductor to an electrical terminal. The electrical connector includes a terminal connection portion configured for connection to an electrical terminal connector of the electrical terminal and a conductor connection portion including a conductor interface surface of the connector configured for engagement of the connector to the electrical conductor to provide an electrical connection between the electrical terminal to the electrical conductor. The conductor connection portion is integrally formed with the terminal connection portion. The connector further includes a conduit formed therein between an inlet opening and an outlet opening. The conduit defines a path for the circulation of a coolant through the connector. The conduit is configured to receive the coolant from a cooling system pipe. The connector includes a heat transfer surface configured to be in contact with the coolant circulating through the conduit for transferring heat from the connector to the coolant.

The arrangements of the specification provide for targeted and improved cooling that can be directed to critical points of an electrical connector. The connector is configured for connecting a high voltage power cable including an electrical conductor to an electrical terminal. The connector has a terminal connection portion and a conductor connector portion and is configured to provide the required electrical connection between an electrical terminal and conductor. The connector is further configured for connection to a cooling system. The connector includes a conduit for receiving a coolant to provide a direct cooling of the connector. The electrical connector is configured such that the coolant directly contacts a heat transfer surface of the connector. The connector is provided as a single integrated connector including a connector body.

In one arrangement, the connector includes a connector body. The conduit is formed integrally within the connector body. The inlet opening and the outlet opening are located on an external surface of the connector.

The provision of a conduit for circulation of coolant internally through the body of the connector provides localized and targeted cooling. The conduit is embedded internally within the connector body and the inlet opening. The connector is advantageously configured for connection to the conductor and to the cooling system. The connector is a single integrated connector that provides in common electrical coupling between a terminal and the conductor and coupling of the connector to the cooling system.

In one arrangement the electrical connector configured for coupling the inlet opening and the outlet opening of the conduit at openings in the cooling system pipe such that the conduit of the connector is arranged in parallel with an interior channel of the cooling system pipe and the coolant circulated through the interior channel of the cooling system pipe is circulated through the conduit of the connector in parallel.

Advantageously, the connector is configured for connection to a cooling system pipe. A coolant is normally pumped through a cooling system and the arrangement of the conduit provides that it is also circulated between the inlet and outlet of a connector conduit. In a further advantageous arrangement, the connector may be connected to the same cooling pipe that also provides cooling to the conductor.

In one arrangement, the electrical connector includes two parts configured to be attached together to form the connector. The conduit is formed between the two parts when attached together.

The connector is formed as a two-part device. This advantageously provides ease of manufacturing and allows control of the location of the conduits and the heat transfer surfaces.

In one arrangement the connector includes a first lower plate portion having an upper surface and a lower surface which in use defines an external conductor facing surface of the connector and a second upper plate portion having an upper surface and a lower surface, which in use is connected to the upper surface of the first lower plate portion. The second upper plate portion includes one or more recesses, which are formed recessed relative to the lower surface thereof. The connector is configured such that when the lower surface of the second upper plate portion is connected to the upper surface of the first plate. The conduit is defined by the recesses located between the plates.

In one arrangement, the first plate portion has an external surface and an opposing internal surface. The second plate portion has an external surface and an opposing internal surface. The first and second plate portions are connected at the internal surfaces thereof to form the connector. One or both of the first and the second internal surfaces include a recessed portion which forms the conduit between the first and second plate portions when the internal surfaces are connected, such that a portion of internal surface of each of the first and second plates define the heat transfer surface of the connector.

The conduit may be advantageously located internally in the single integrated body of the connector. These arrangements advantageously provide for flexibility in defining the location, form and extent of the conduit and pathway for the coolant in the connector.

In one arrangement the connector includes a conducting body for conduction of electricity from an electrical terminal to the electrical conductor of the high power cable and for conduction of heat from the connector body to the heat transfer surface and coolant.

The arrangements of specification are advantageously configured for use and operation across a wide range of current loads, for example from 100 A to 1000 A, or even higher. The form, structure and dimensions of the power cable assembly may be adjusted as required for loading and to provide the required thermal response levels.

In one arrangement, the conductor connection portion includes a conductor interface surface configured for clamping to the electrical conductor. The conductor interface surface defines a mating surface for clamping to a corresponding mating surface of the conductor.

In one arrangement, the electrical terminal connection portion includes a port and an electrical terminal interface surface. The port is configured for connection of the electrical terminal connector to the connector such that the electrical terminal interface surface is arranged in electrical contact with the electrical terminal connector for conduction of electricity between the connector and the terminal.

External surface portions of the connector, in the exemplary arrangement the lower external surface, are configured to provide electrical coupling of the connector to the conductor and to the electrical terminal connector and to provide coupling of the conduit to the cooling system.

In one arrangement, the inlet opening and the outlet opening of the conduit are configured for alignment respectively with a flow opening and a return opening of the cooling system pipe for circulation of the fluid through the conduit.

In one arrangement the inlet opening and outlet opening of the conduit are formed in the conductor interface surface, which in use is coupled to the electrical conductor.

According to the combination of features of this arrangement, the connector is configured for coupling to the conductor at the conductor interface surface and cooling system pipe which is defined by the conductor. The arrangement supports the electrical conducting and cooling operations at a common interface between the conductor and the connector. The dual functions, of conducting electricity and of interfacing with the cooling system pipe and cooling system, are both supported at a common interface.

The electrical connector may be arranged according to one or more of the following:
  (i) the connector is formed of a metal material configured to conduct electricity and heat;
  (ii) the connector is formed of a metal material;
  (iii) the connector is formed of copper, electrolytic tough-pitch copper (ETP copper), and/or a copper alloy;
  (iv) the connector is formed of aluminum, and/or an aluminum alloy.

According to a further aspect, there is provided a high voltage power cable assembly including an electrical conductor extending longitudinally between first and second end contact surfaces configured for coupling via first and second connectors to respective electrical connections. The electrical conductor includes an internal surface and an external surface and a conducting body therebetween; wherein the internal surface defines an interior channel between a first end opening and a second end opening configured for receiving a coolant from a cooling system arranged in communication with the conductor. Each contact surface of the conductor further includes a flow opening and a return opening. The high voltage power cable assembly further includes one or more electrical connectors according to one or more of the arrangements of the present specification. The conductor interface surface of the electrical connector is configured to be attached at a corresponding contact surface of the conductor to provide an electrical connection between the electrical conductor and an electrical terminal. The electrical connector and electrical conductor are configured such that when connected. The inlet opening and outlet opening of the conduit of the electrical connector are engaged with the flow opening and return opening respectively of the electrical conductor. The conduit is configured to receive the coolant from the cooling system in communication with the electrical conductor.

The arrangements of the specification are configured to provide improved cooling at critical points of the high voltage power cable assembly and accordingly improved operation and performance. Further the conductor is configured for connection to a cooling system and the connector is arranged for connection to a cooling system and according to the assembly both of these components are advantageously connectable to a common cooling system. The configuration is such that the coolant is circulated through the conductor and connector in parallel by a common cooling system.

In one arrangement, the electrical connector and the electrical conductor are configured such that the coolant circulated by the cooling system is circulated in parallel through the electrical conductor and through the conduit.

The electrical conductor may be arranged according to one or more of the following:
  (i) the electrical conductor includes a tubular or cylindrical form;
  (ii) the electrical conductor includes a busbar;
  (iii) the electrical conductor defines a cooling system pipe arranged to receive the coolant from the cooling system.

In one arrangement the high voltage power cable assembly further includes a first insulating layer surrounding the electrical conductor. In one arrangement, the internal surface of the electrical conductor is a heat transfer surface arranged to be in direct contact with the coolant for transferring heat from the conducting body to the coolant.

In one arrangement, the internal surface of the electrical connector, adjacent to the conduit defines a heat transfer surface arranged to be in direct contact with the coolant for effecting a transfer of heat from the electrical connector to the coolant.

In one arrangement, the electrical connector and the electrical conductor are configured such that the coolant circulated by the cooling system is circulated in parallel through the electrical conductor and through the conduit.

In one arrangement, the electrical connector is attached to the electrically conductive core, for example via welding, brazing or soldering.

The electrical conductor may be arranged according to one or more of the following:
  (i) the electrical conductor may be formed of a metal material;
  (ii) the electrical conductor may be formed of copper, ETP copper, and/or a copper alloy;
  (iii) the electrical conductor may be formed of aluminum, and/or an aluminum alloy.

In one arrangement, the external surfaces of the connector and the conductor may include a first insulating layer, the insulating layer configured to surround the connector and the conductor assembly.

In one arrangement, the high voltage power cable assembly may further include:
  (i) a shielding layer surrounding the first insulating layer; and
  (ii) a second insulating layer external to the shielding layer.

According to a third aspect, there is provided a cooling system configured for coupling with a power cable assembly according to aspects of the present specification. The cooling system is configured to circulate a coolant between a coolant inlet and a coolant outlet via the interior channel of the electrical conductor and the conduit of the electrical connector. The cooling system includes a pump; a cooling unit, and one or more connectors according to aspects of the present specification, for connecting the coolant inlet and the coolant outlet to the power cable assembly. The coolant is circulated in direct contact with the heat transfer surfaces of the electrical conductor and of the electrical connector.

The coolant or coolant of the arrangements described may include one of the following:
  (i) a conductive coolant;
  (ii) a dielectric coolant
  (iii) a dielectric liquid;
  (iv) 3M FLUORINERT FC-43;
  (v) 3M NOVEC 7500; and/or
  (vi) transformer oil.

In one arrangement, the coolant is thermally coupled to the heat transfer surface of the power cable assembly and to the heat transfer surface of the connector locator adjacent to the conduit to provide heat transfer therefrom to the coolant.

In one arrangement, the coolant inlet and coolant outlet are arranged according to one of the following:
  (i) the coolant inlet and coolant outlet are located at opposite ends of the electrical conductor; or
  (ii) the coolant inlet and coolant outlet are located at the same end of the electrical conductor.

The specification further provides a power distribution system including a power cable assembly. according to various arrangements of the specification, extending between first and second end contact surfaces configured for coupling, via first and second connectors, according to various arrangements of the specification, to respective electrical connections of the power distribution system and an integrated cooling system, according to arrangements of the specification, coupled to the power cable assembly for circulating the coolant between the coolant inlet and coolant outlet of the interior channel of the electrical conductor.

BRIEF DESCRIPTION OF THE DRAWINGS

The present invention is now described, by way of example with reference to the accompanying drawings, in which:

FIGS. 1A, 1B and 1D show perspective views of a connector coupled to a conductor. FIG. 1C shows a top side view of the arrangement of FIGS. 1A, 1B and 1D.

FIGS. 3A and 3B shows cross sectional and perspective views. FIG. 3B includes an illustration of the flows of coolant in the conductor and in the connector; FIG. 3C shows an exploded perspective view of the arrangement of FIGS. 3A and 3B. FIG. 3D shows front and side exploded views of the arrangement of FIGS. 3A and 3B.

DETAILED DESCRIPTION

Figure 1A:
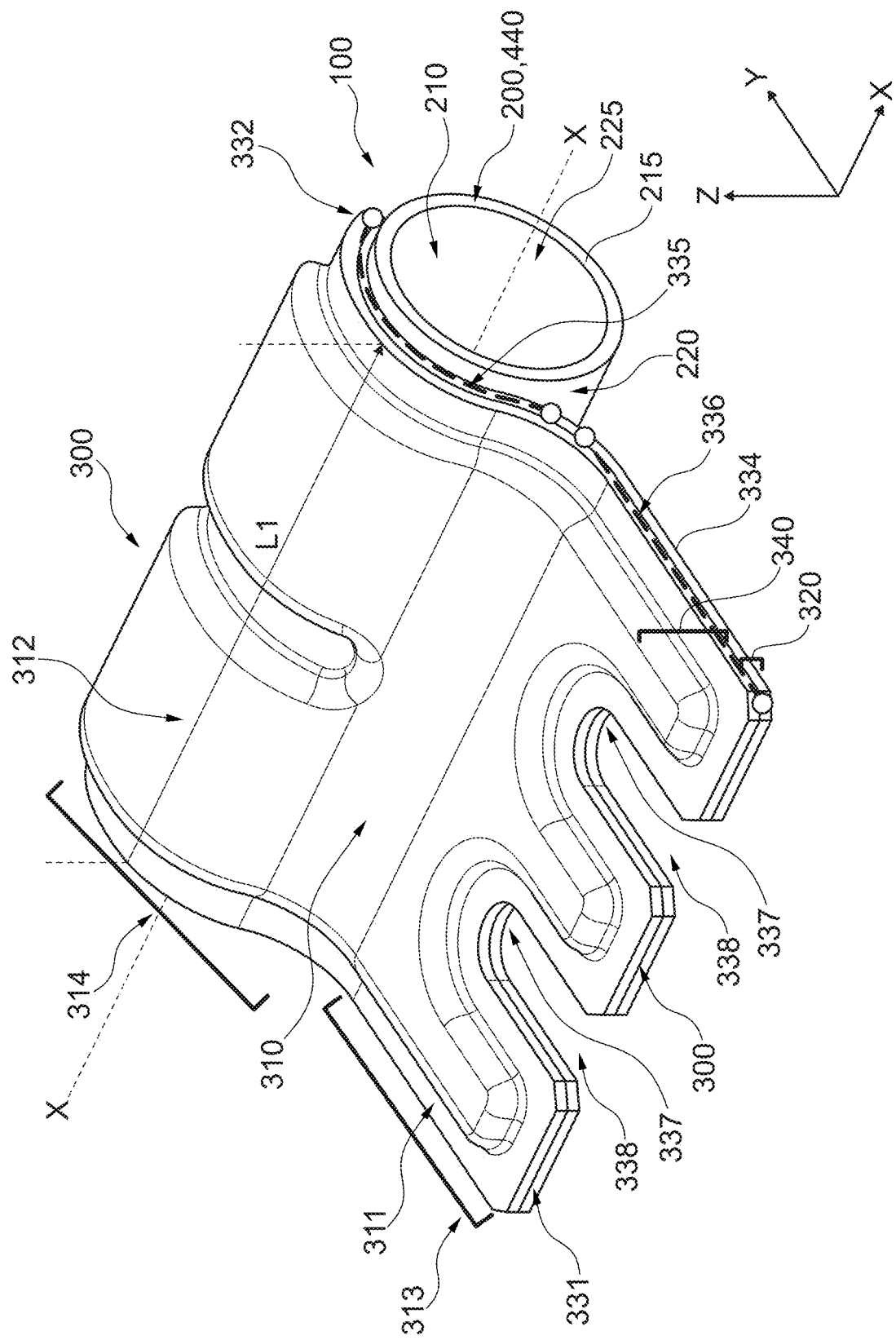
FIGS. 1A, 1B, 1C and 1D provide views of an exemplary connector and power cable assembly according to some embodiments.
Figure 1B:
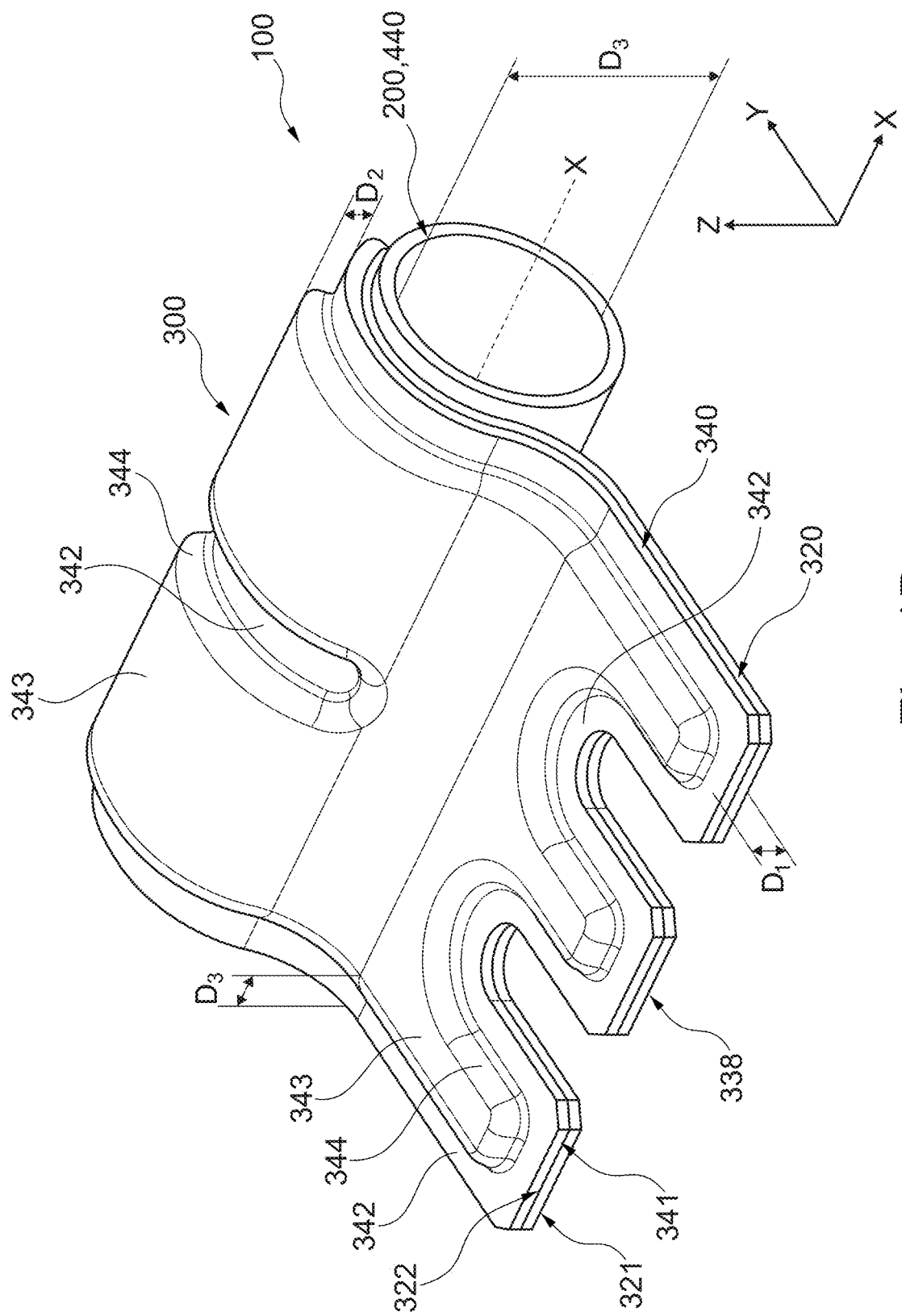

The following discussion provides many exemplary embodiments of the inventive subject matter. Although each embodiment represents a single combination of inventive elements, the inventive subject matter is considered to include all possible combinations of the disclosed elements. Thus, if one embodiment includes elements A, B, and C, and a second embodiment includes elements B and D, then the inventive subject matter is also considered to include other remaining combinations of A, B, C, or D, even if not explicitly disclosed.

For simplicity and clarity of illustration, reference numerals may be repeated among the figures to indicate corresponding or analogous elements. Numerous details are set forth to provide an understanding of the examples described herein. The examples may be practiced without these details. In other instances, well-known methods, procedures, and components are not described in detail to avoid obscuring the examples described. The description is not to be considered as limiting to the scope of the examples described herein.

A power cable assembly 100 according to specification is described with reference to the figures. The power cable assembly 100 includes an electrical conductor 200. The power cable assembly 100 has a longitudinal axis that extends in the X-direction as illustrated in FIG. 1A. FIGS. 1 to 3 show that portion of the assembly 100 at the connection of the conductor to a connector which provides for connection to an electrical terminal. The features of the power cable assembly 100 are arranged about the longitudinal axis thereof.

The power cable assembly 100 includes an electrical conductor 200. The electrical conductor 200 is both electrically conductive and thermally conductive. The electrical conductor 200 extends longitudinally between a first contact end surface 205 and a second end contact surface 205 at opposing first and second ends of the electrical conductor 200 and of the power cable assembly 100. The contact surfaces 205 are conducting surfaces. The electrical conductor 200 is configured for coupling via first and second connectors to respective electrical connections. For example, the electrical conductor may be configured for coupling via a node of an electrical power supply at a first end and a battery at a second, respectively. The electrical conductor 200 is configured for connecting to a power distribution system. Referring to the drawings, a high voltage power cable assembly 100 according to exemplary embodiments of the specification is described. The power cable assembly 100 an electrical conductor 200 and a connector 300. The electrical conductor 200 is arranged to extend longitudinally (X direction) between first and second ends thereof. The features of the electrical conductor 200 and the power cable assembly 100 are arranged about the longitudinal axis. The electrical conductor 200 is both electrically conductive and thermally conductive. The electrical conductor 200 includes a first contact surface 205 and a second contact surface 205 at opposing ends thereof. The contact surfaces 205 are conducting surfaces.

In the FIGS. 1 to 3 that portion of the conductor, at the contact surface 205 and a connector 300 are shown. The electrical conductor 200 is configured for coupling via first and second connectors 300 to a respective electrical terminal connector 550. The electrical conductor 200 is configured for connecting to a power distribution system. For example, the electrical conductor may be configured for coupling via a node of a power supply at a first end of the conductor and a battery at a second end, respectively. Accordingly, the power cable assembly 100, 200, 300 may for example be used in applications including for the delivery of power from a power supply to provide charging of a battery of a car.

In a preferred arrangement, coolant is circulated through the conductor 200 in direct contact with the inner surface 210 of the conductor. The coolant may be a conductive coolant. The coolant may be a dielectric coolant. In the exemplary arrangements of the specification the coolant is provided as a dielectric coolant. The inner surface 210 of the conductor is configured to be in contact with the coolant defines the heat transfer surface.

It will be appreciated that the coolant may be a dielectric coolant or a conductive coolant. While some examples of coolants are provided below, it will be appreciated that suitable alternatives may be provided. The examples below in particular relate to dielectric coolants. However, as noted alternatives may be used.

Referring initially to FIGS. 1A, 1B, 1C and 1D, the electrical connector 300 of the power cable assembly 100 is described. Electrical connector 300 is configured for connecting between the electrical conductor 200 and an electrical terminal of the power distribution system.

The connector 300 includes a connector body 310 having an electrical conducting portion 311 and a cooling portion 312. The connector body 310 also includes a terminal connection portion 313 and a conductor connection portion 314. The terminal connection interface and conductor interface portions are integrally formed. The electrical conducting portion is configured for coupling between the power source and the electrical conductor to conduct electricity from the electrical terminal to the conductor. The terminal connection interface portion 313 is that portion of the connector 300 that interfaces with an electrical terminal connector 550 of an electrical terminal 510 and arranged to the terminal facing side T of the connector. The conductor interface portion 314 is that portion of the connector 300 configured to interface with the conductor and arranged to the conductor facing side C of the connector.

The terminal connector interface and conductor interface portions 313, 314 and the conducting and cooling portions 311 and 312 are integrally formed in the connector 300. In the arrangement of the drawings the terminal interface and conductor interface portions are essentially adjacent portions of the connector, in the lateral Y direction. The conducting portion 311 is arranged essentially across the area of the connector 300 in X and Y and across both the terminal connector interface and the conductor interface portions 313, 314. The cooling portion 312 in the arrangements shown similarly extends in X and Y across the selected areas of the connector at both the terminal connector interface and conductor interface portions 313, 314. The cooling portion 312 is in general arranged to an upper region of the connector.

The conducting portion 311 is that part of the connector that conducts electricity between the electrical terminal connector 550 and the conductor 200. The conducting portion 311 extends from the terminal connector portion 313 of the connector to the conductor interface portion 314.

The terminal connection portion 313 is configured for connection to an electrical terminal connector 550 of an electrical terminal 510 or 520. The terminal connection portion 313 defines port 338 for fixing the connector 300 to the electrical terminal connector 550. In the arrangement of the drawings the port 338 includes receivers 337 for receiving a bolt 551 and nut 552 or other suitable fixing means. The terminal connection portion 313 also includes an electrical terminal connector contact surface 336, defined by a portion of the lower surface of the connector 300. The electrical terminal contact surface 336 is arranged to contact a surface of the electrical terminal connector 550, when the connector 300 is connected to the electrical terminal connector 550, shown also in FIG. 3B. The electrical terminal contact surface 336 is a part of the conducting portion 311 of the connector.

The conductor interface portion 314 further includes a conductor interface surface 335 or contact surface 335 for connection to the electrical conductor 200 to provide power from the electrical terminal to the electrical conductor. The electrical terminal contact surface 336 is conducting. The electrical terminal contact surface 336 is a part of the conducting portion 311 of the connector.

The connector 300 includes a first lower plate 320 and a second upper plate 340 which are fixed together to form the connector 300. The lower plate 320 includes a lower surface 321 which in use is arranged in a direction facing a surface 205 of the conductor 200 and an upper surface 322 which in use is facing towards and connected to the upper plate 340. The upper plate 340 includes a lower surface 341 which in use faces and is connected to the upper surface 322 of the lower plate.

The upper plate 340 is profiled and includes upper surface portions 342, 343 and 344 defining an externally facing surface of the connector. The upper surface portion 343 is raised relative to the upper surface portion 342. The upper surface portion 342 is non-profiled and is arranged extending around the peripheral upper surface portion of the connector and between the side and end walls of the connector and the raised portions 343.

The depth of the connector in the Z-direction taken between the lower external surface 321 and the upper non-profiled surface portion 342 is D1. The depth of the raised upper surface 343 portion relative to the non-profiled portion 342 is D2.

The conducting portion 311 is defined at least in part by the lower plate 320. The lower surface 321 of the conductor includes the conductor contact surface 335 portion and the electrical terminal connector contact surface portion 336. The conducting portion 311 may be defined by a least a portion of each of plates 320 and 340.

Figure 1C:
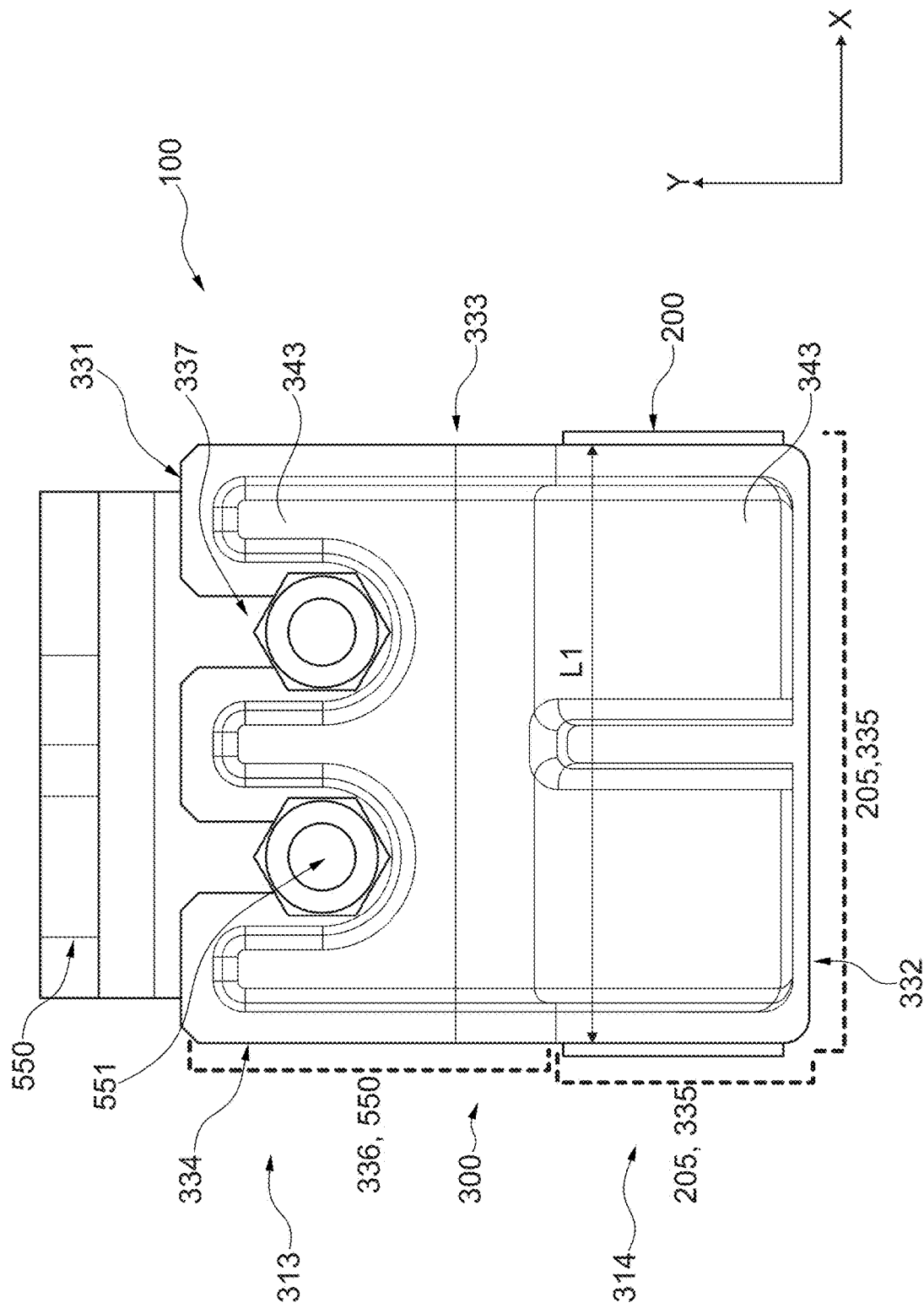
Figure 1D:
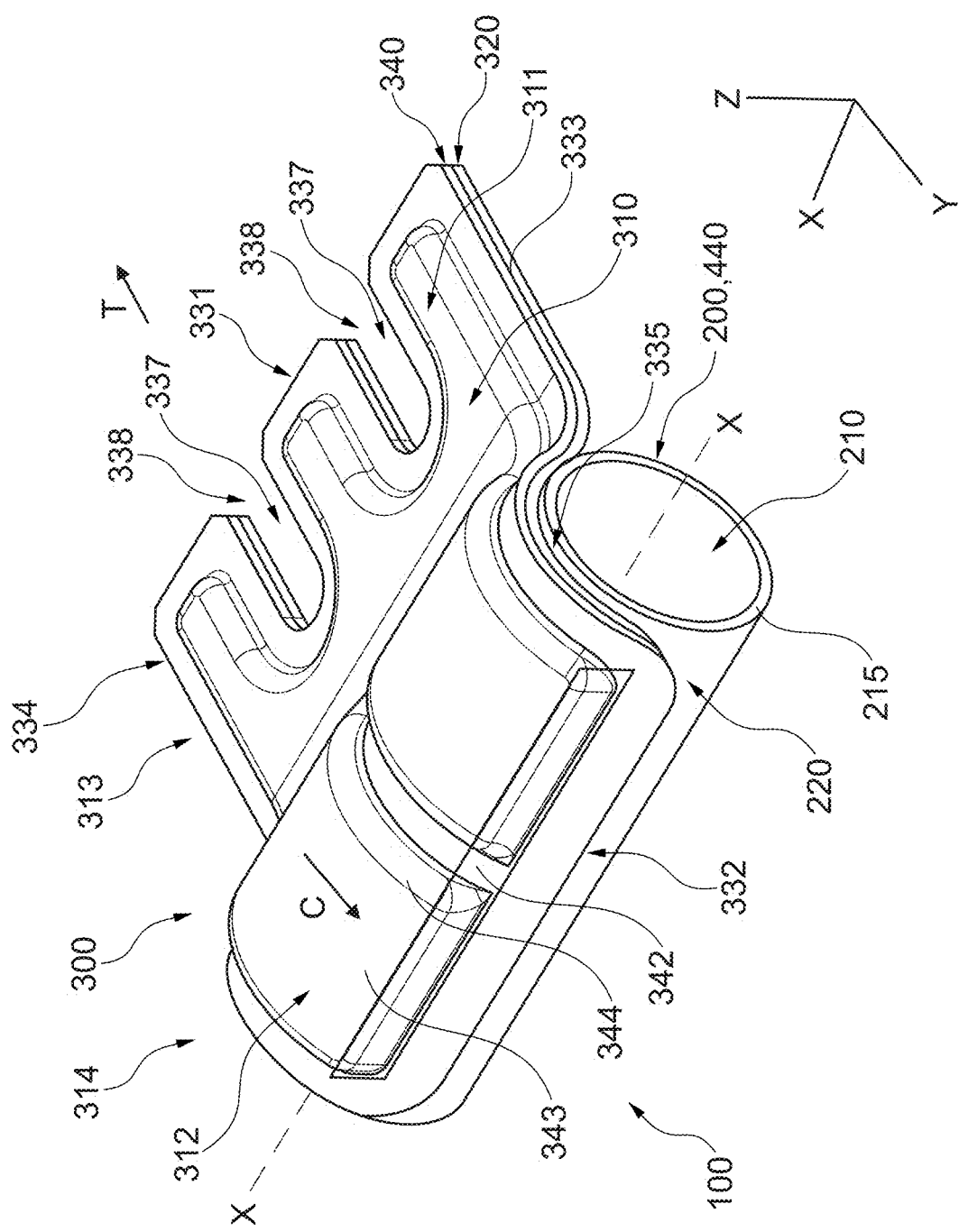

As illustrated in FIGS. 1A, 1C and 1D, the connector 300 has first and second longitudinal side walls 331, 332 that extend generally in the longitudinal direction (X) and first and second lateral end walls 333 and 334 that extend therebetween. The first side wall 331 which in use is located at a terminal connection side includes receivers 337, formed recessed relative to the first side wall 331 and each for receiving a fixing for connector to the electrical terminal connector.

The conductor contact surface 335 or conductor engagement surface 335 of the connector is a portion of the connector that is formed and shaped for mating with the contact surface 205 of the conductor 200. In the exemplary arrangement, the conductor 200 has a cylindrical form. The contact surface 205 of the conductor 200 is curved, and the conductor engagement surface 335 of the connector 300 is similarly curved for mating and connecting to the contact surface 205 of the conductor 200. The conductor engagement surface portion 335 extends the length L1 of the connector in the X direction and in the lateral direction has an extent across between about one third or about half of the surface area.

In the lateral direction the connector 300 extends between the electrical terminal side 331 and the conductor side 332, and includes two zones or portions, namely a generally planar portion 336 which in use is arranged to interface with a corresponding portion of an electrical terminal connector and the curved conductor contact or engagement surface portion 335.

Figure 3A:
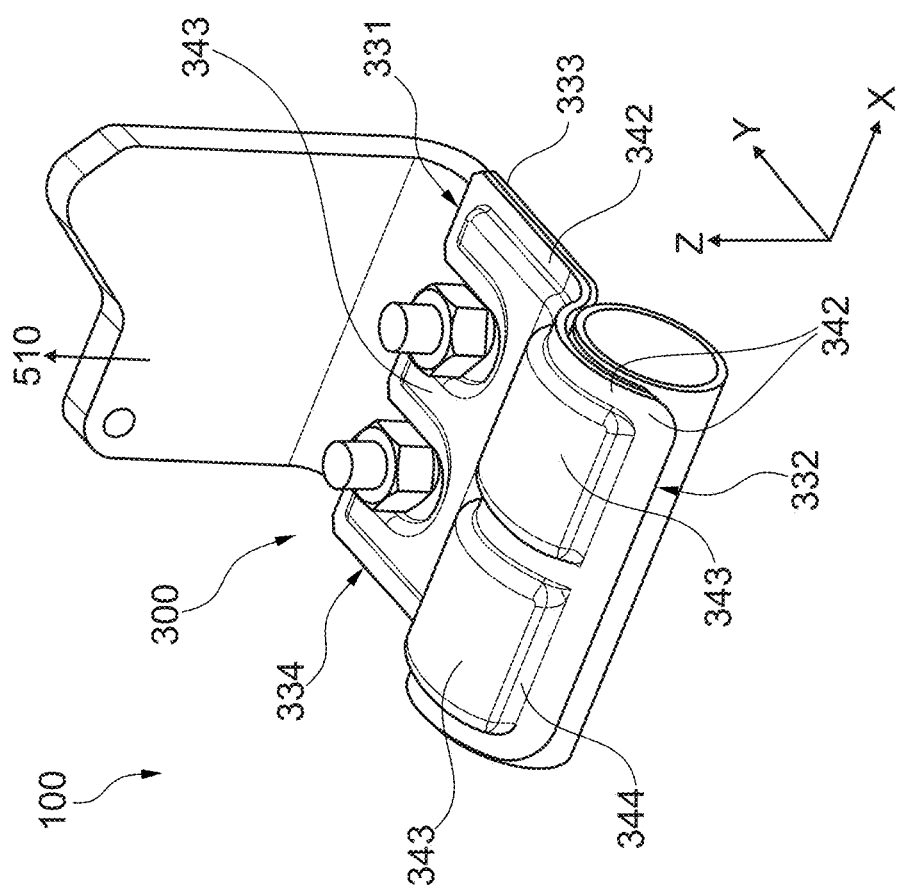
FIGS. 3A, 3B, 3C and 3D each provide views of an exemplary power cable assembly according to some embodiments showing a connector connected between a terminal and a conductor.
Figure 3A:
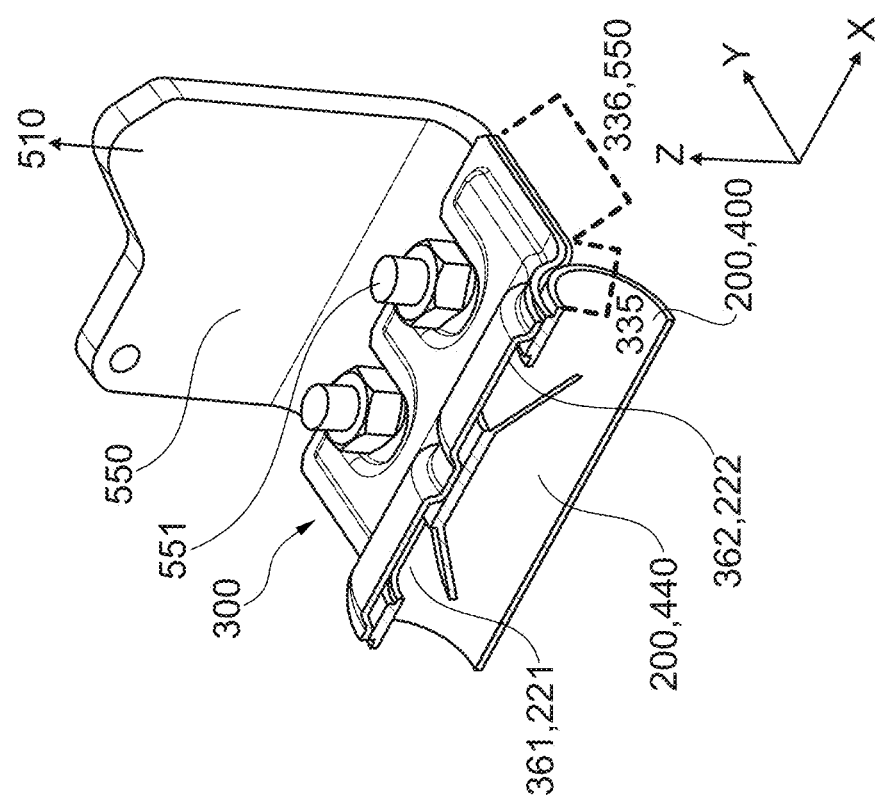

Reference is made also to FIG. 3A which shows each of the lower surface contact portions or engagement portions 336 and 335 of the connector when connected to an electrical terminal connector 550 and to the conductor 200, respectively.

The conductor engagement surface 335 of the connector is shaped and formed for mating with the contact surface 205 of the electrical conductor 200. The interface surface 335 defines an external mating surface of connector 300 which is configured for connection to the conductor. The engagement surface 225 is a portion of the lower surface 321 of the connector. In the arrangement shown, the interface surface 335 is located at the curved part of the plate 320. The interface surface 335 may be securely engaged with the electrical conductor 200 at the contact surface 205 by soldering. It will be appreciated that the connector 300 may be alternatively attached to the electrically conductive core 200, for example via welding or brazing. In effect the connector 300 is clamped to the electrical conductor by the engagement at the corresponding interface surface 335 and the contact surface 205 respectively thereof. The conductor 200 has a diameter D3, and related curvature.

Figure 2A:
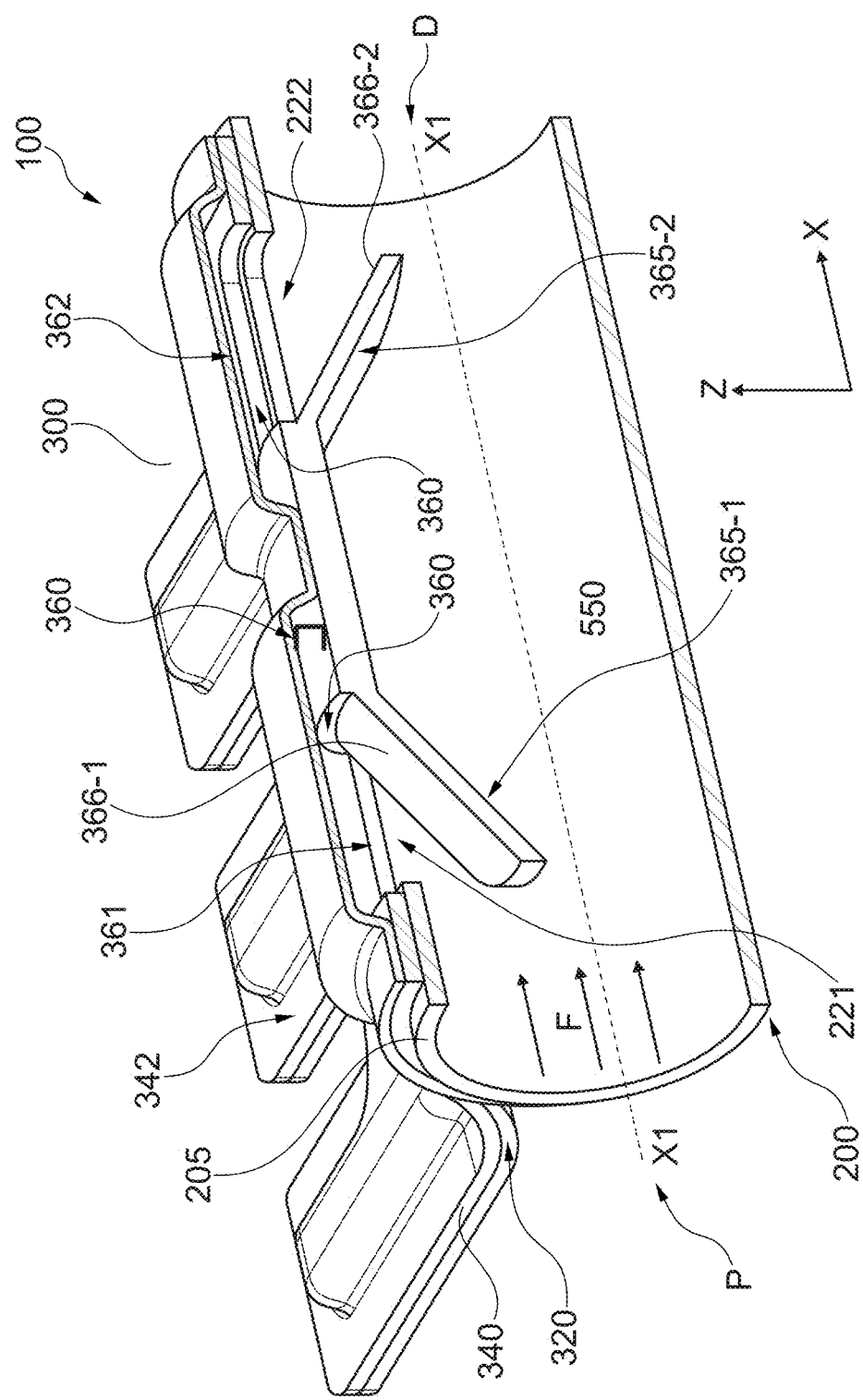
FIGS. 2A and 2B each provide a longitudinal cross-sectional view of the power cable assembly of FIG. 1, showing portions of the connector and the conductor in the cross-section and the coupling of these components according to some embodiments.
Figure 2B:
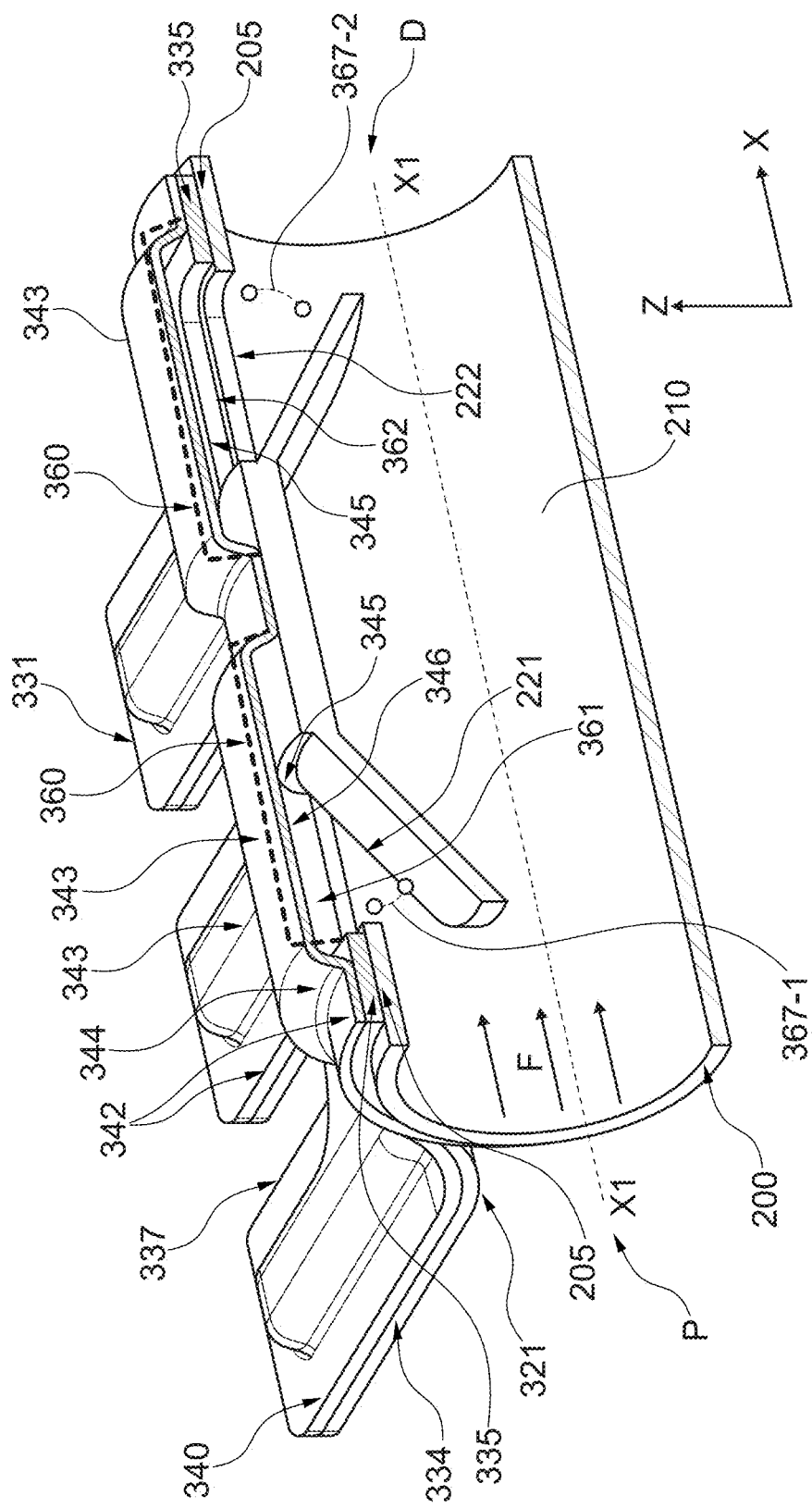

Referring to FIGS. 2A and 2B, the connector 300 includes a fluid cooled connector. The connector 300 includes a conduit 360 formed therein between an inlet opening 361 and an outlet opening 362. The conduit 360 defines a path for the circulation of a coolant 250 through the connector body 310.

The cooling portion 312 is defined by the upper plate 340 coupled to the lower plate 320. The conduit 360 is located between the upper plate 340 and the lower plate 320 which are assembled together to form the connector body 310. The conduit 360 is defined by recesses 345 of the upper plate.

The upper plate portion 340 of the connector 300 has upper surface portions 342, 343 and 344 and lower surface portions 341 and 346 located on the respectively opposing parts.

The external upper surface portions 342 and the corresponding opposing lower surface portions 341 define non-profiled portions of the upper plate and connector. The non-profiled upper surface portion 342 and corresponding lower surface portion 341 extend around the peripheral portion of the upper surface and between the inlet and outlet portions of the conduit 360.

As noted above the upper plate 340 is profiled and includes one or recesses 345 formed therein. The upper plate 340 is profiled to provide the recesses 345. The external surfaces 343 and 344 are external to the recesses 345. The profiled or raised form of the surfaces 343 and 344 relative to non-profiled surface portions 341 and 342 of the exemplary arrangement of the drawings shows the location and form of the recesses 345. It will be appreciated that when plate 341 is viewed from the underside, recesses 345 are recessed relative to the lower peripheral surface portion 341 of the plate. By controlling the form and location of the recesses 345, the arrangement of the provides for creation of the conduit 360 that provides a path between the inlet 361 and outlet 362 for the coolant.

The connector 300 is configured such that when the non-profiled or peripheral portions 341 of the lower surface of the second plate 340 are connected to the upper surface 322 of the first plate 320, the conduit 360 is defined by the recesses 345 located between the plates 320 and 340.

The conduit 360 is configured for coupling to a cooling system 400 and to receive a coolant 450 from a pipe 440 of a pipe cooling system. The connector 300 includes a heat transfer surface arranged to be in contact with the coolant 250 circulating through the conduit 350 for transferring heat from the connector body to the coolant. The heat transfer surface may be defined by the upper surface 322 of the lower plate 321 and the internal surface 346 of the upper plate 340 at the recesses 345. The surfaces 346 and 322 being the surfaces located at and define the internal peripheral surfaces of the conduit 360.

The conductor 200 is configured for connection to cooling system 400. Referring to FIG. 1A, the conductor 200 includes a conductor body 215 having an external peripheral surface 220 and an internal peripheral surface 210. The conductor, in the exemplary arrangement shown, is of generally cylindrical form. An internal surface 210 defines an interior channel 225 that is provided extending through the conductor body 215 from a first end opening to a second end opening. The interior channel 225 is configured for receiving a coolant from a cooling system 200 arranged in fluid communication with the electrical conductor 130.

The electrical conductor 200 has a tubular or pipe form. The coolant 450 used in the exemplary arrangement of the specification includes a dielectric coolant 450. The coolant 450 is circulated through the interior channel 225. The electrical conductor 200 defines a coolant pipe 440 for the dielectric coolant 450, and also defines the electrically conducting body 215. The dielectric coolant is circulated through the interior channel 225 of the electrical conductor 200.

The coolant pipe 440 of the pipe cooling system 240 is connected to a fluid circuit 400. Coolant 450 is circulated through the interior channel 225 of the pipe 440 and the conductor 200 and between a flow outlet and a return inlet of the cooling system 400.

Referring to FIGS. 2A and 2B, the conductor 200 includes openings 221 and 222 formed in the conductor body at the contact surface 205. The opening 221 defines a flow opening through which coolant 450 flows from the coolant pipe 440 flows into the conduit 360 of the connector. The opening 222 defines a return opening through which coolant returns from the conduit 360 of the connector.

The connector 300 is connected to the conductor 200 at an interface surface 335. The interface surface 335 is clamped to a contact surface 205 of the conductor. As shown in FIG. 2B the contact surface 205 and the interface surface 335 are formed to correspond for mating. Both surfaces are curved, and in the drawings shown clamped together with the openings 221,361 and 222,362 aligned.

In use, when the connector 300 is clamped at the clamping location to the electrical conductor 200, the inlet opening 361 of the conduit 360 is connected at the flow opening 221 of the coolant pipe and the outlet opening 362 of the conduit is connected at the return opening 222 of the coolant pipe 440. Therefore, the connector is configured for coupling at a socket of the coolant pipe 440/conductor 200 as defined by the flow and return openings 221, 222 such that the conduit 360 of the connector 300 is arranged in parallel with the interior channel 225 of the pipe 440. The coolant 450 is circulated through both the interior channel 225 of the pipe 440 and the conductor 200, and the conduit 360 of the connector 300 in parallel. The coolant is a dielectric coolant that is circulated and in direct contact with the surfaces of the connector 300 that are located at the conduit 360.

A flow diverter flange 365 or vane 365 may be located at one or both of the openings 361 and 362. In the arrangement of FIG. 2A, flanges 365-1 and 365-2 are provided at the 361 and the outlet 362 respectively.

Each flange 365 is configured to assist in directing flow of the coolant 450 between the coolant pipe and the conduit 360. Each flange includes a surface 366-1 and 366-2 that is configured to face the direction of flow. Flanges 365 extend into the interior channel of the pipe relative to the internal peripheral surface and the openings 321 and 322. Each flange is arranged at an angle relative to the internal peripheral surface and the openings.

The direction of flow F of coolant 450 is from a proximal end P of the coolant pipe 440 and the connector 300 to a distal end D of the coolant pipe and connector. Each of the inlet 361 and coolant outlet 362 and flanges 365 has a proximal end and a distal end, the proximal and distal ends being defined relative to the direction of flow.

A first flange 365-1 is arranged at the flow outlet of the pipe and the inlet 361 of the conduit 360. The flange 365-1 projects relative to the distal end of the inlet 361 at an acute angle 367-1 such that an upper surface 366-1 thereof faces into the direction of flow of the coolant and is arranged to divert coolant from the interior channel to the inlet 361. The proximal end of the flange 365-1 is located spaced apart at a maximum distance from the inlet. The distal end of the flange 365-1 is located in proximity to the inlet.

A second flange 365-2 is arranged at the return inlet of the pipe 222 and the outlet 362 of the conduit 360. The flange 365-2 projects relative to a proximal end of the outlet into the interior channel 225 at an acute angle 367-2 thereto such that an upper surface 366-2 thereof faces away from the direction of flow of the coolant in the coolant pipe 440 and is arranged to return coolant from the conduit 260 into the coolant pipe in the direction of flow. The distal end of the flange 365-2 is located spaced apart at a maximum distance from the outlet. The proximal end of the flange 365-2 is located in proximity to the outlet.

The one or more flanges 365 may be formed integrally with the connector and configured such that when the inlet 361 and outlet 362 of the connector are located at the openings 221 and 222 of the pipe, the flanges extend from the connector into the pipe.

Alternatively, the one or more flanges may be provided formed integrally with the pipe 440/conductor 200 at the internal peripheral surface 210 thereof, such that when the connector inlet and outlet are located at the openings of the pipe, the flanges are located at the inlet and outlet of the connector, to direct flow, as required.

In one arrangement the vanes 365 may be formed when the openings 221, 222 are provided in the conductor wall. The vanes 365 may be left a portion of the conductor wall left after punching the openings. The vanes 365 are angled relative to the interior surface 210 and to the openings 221, 222 and directed to assist in providing the coolant to the connector 300 and for returning it to the pipe 440/conductor 200.

While the flanges 365 described and illustrated have an elongated form and are configured to project into the interior channel, it will be appreciated that suitable alternative arrangements may be provided.

Referring to FIG. 3A connector 300 is shown connected between an electrical terminal 550 and the conductor 200 at bolts 551 and nuts 552. The surface 336 of the connector interfaces to the terminal 550.

The conductor engagement surface 335 of the connector is fixed to the contact surface 205 of the conductor. The conductor 200 also defines the coolant pipe 440 of the fluid circuit of a connected cooling system. The inlet 361 and outlet 362 of the conduit 360 of the connector are shown engaged at the flow outlet 221 and return inlet 222 of the coolant pipe 440/conductor 200.

Figure 3B:
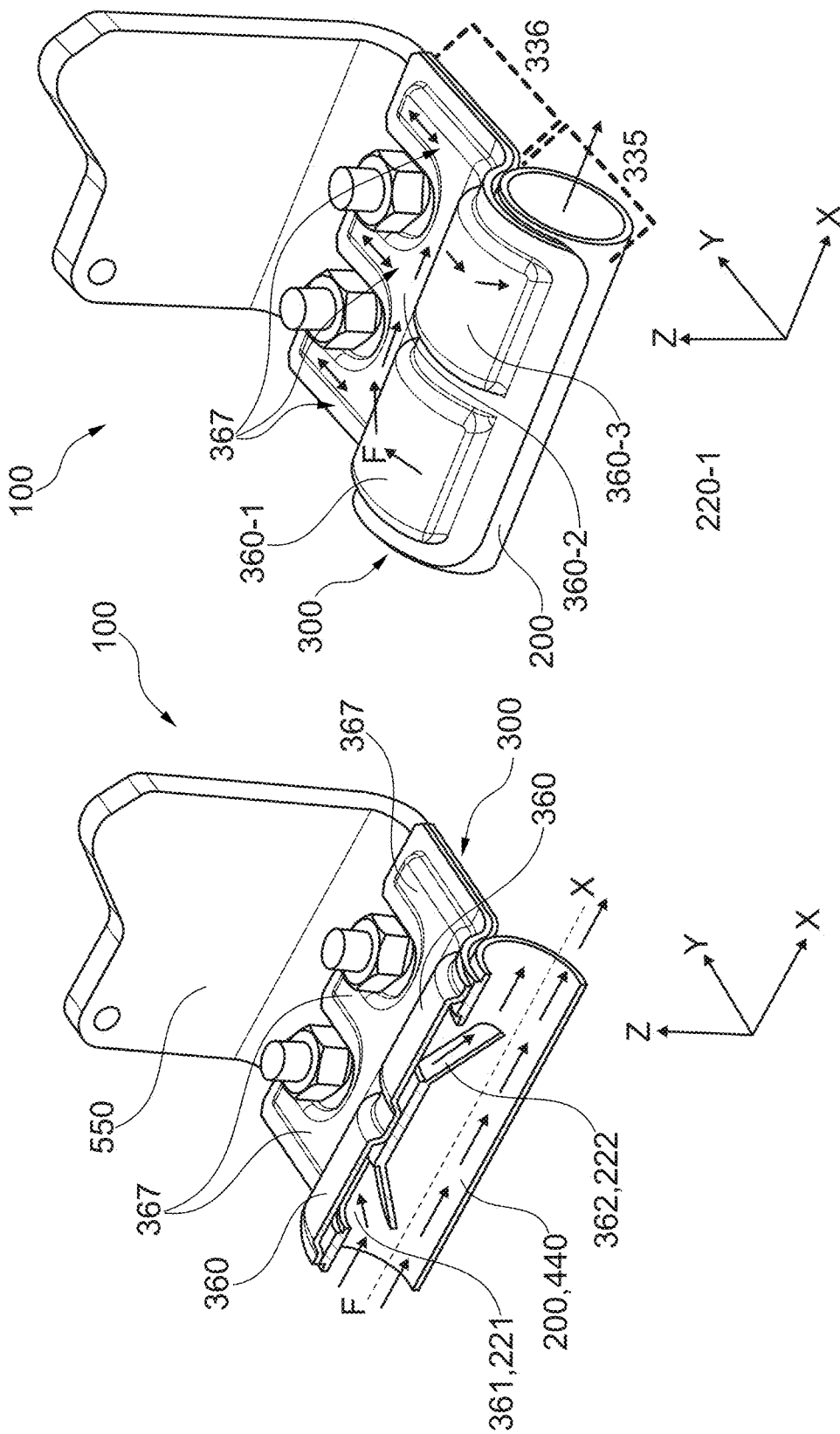

In FIG. 3B the directions of flow of the coolant 450 through the conductor 200/coolant pipe 440 are illustrated. As shown in the external view of the connector 300, the profiled form of the connector indicates the location of the recesses 345 defining the conduit 360. The coolant is circulated through the connector and as it contacts the surfaces proximate to the conduit 360 namely an inner recessed surface 346 of the upper plate 340 and an upper surface 322 of the lower plate, heat is transferred from the connector 300 to the circulating coolant. The conduit 360 describes a generally u-shaped or n-shaped continuous path between the inlet 361 and the outlet 363. Referring to FIG. 3B portions 360-1, 360-2 and 360-3 of the conduit 360 are shown. The conduit may further include channel portions 367 in communication with the main portion of the conduit 360, formed and located to provide circulation of fluid to and between the port 338 and receivers 337 at the electrical terminal connection portion 313. As illustrated in FIG. 3B coolant 450 flows in through inlet 361 through portion 360-1, and portion 360-2 and then via portion 360-3 to the outlet 362.

Figure 3C:
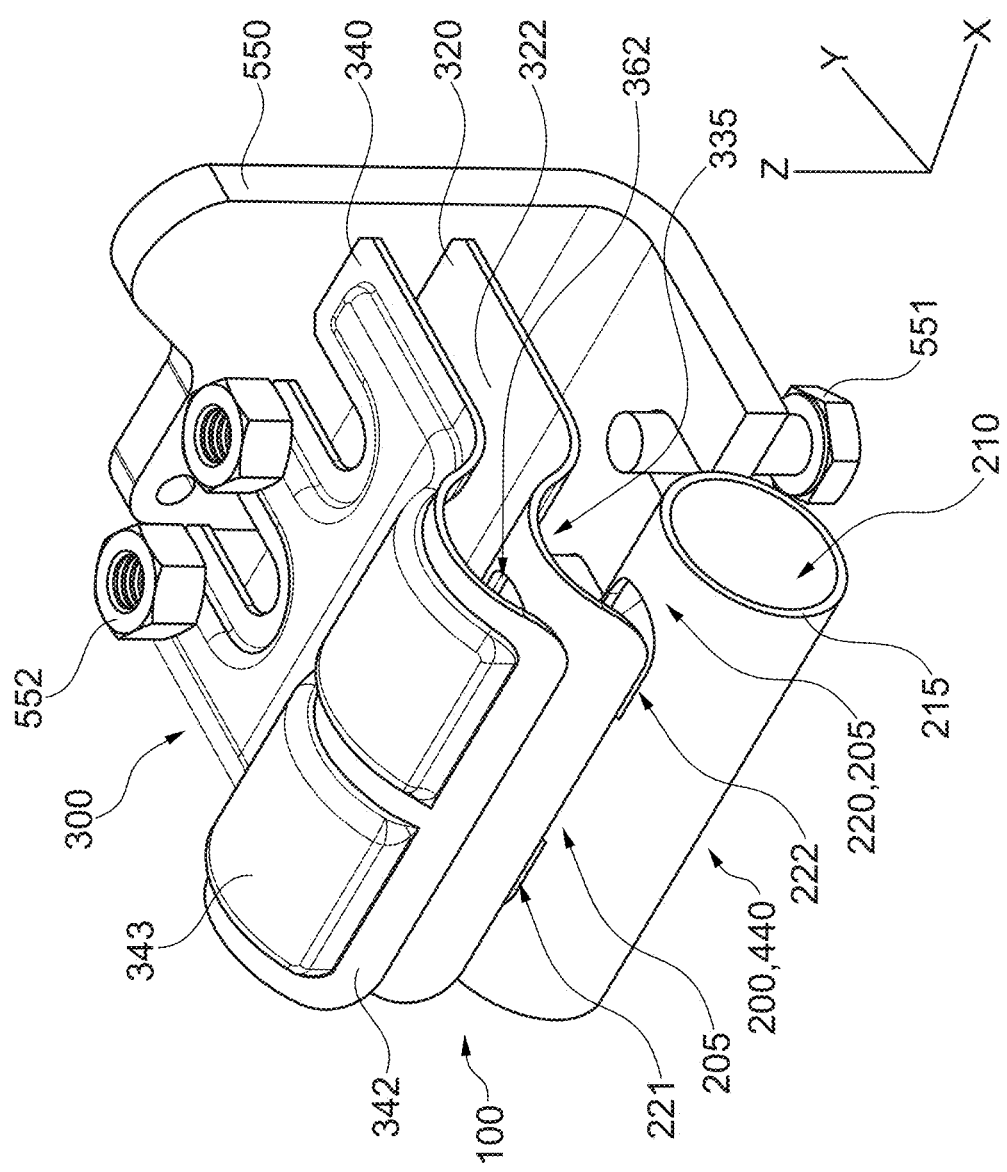
Figure 3D:
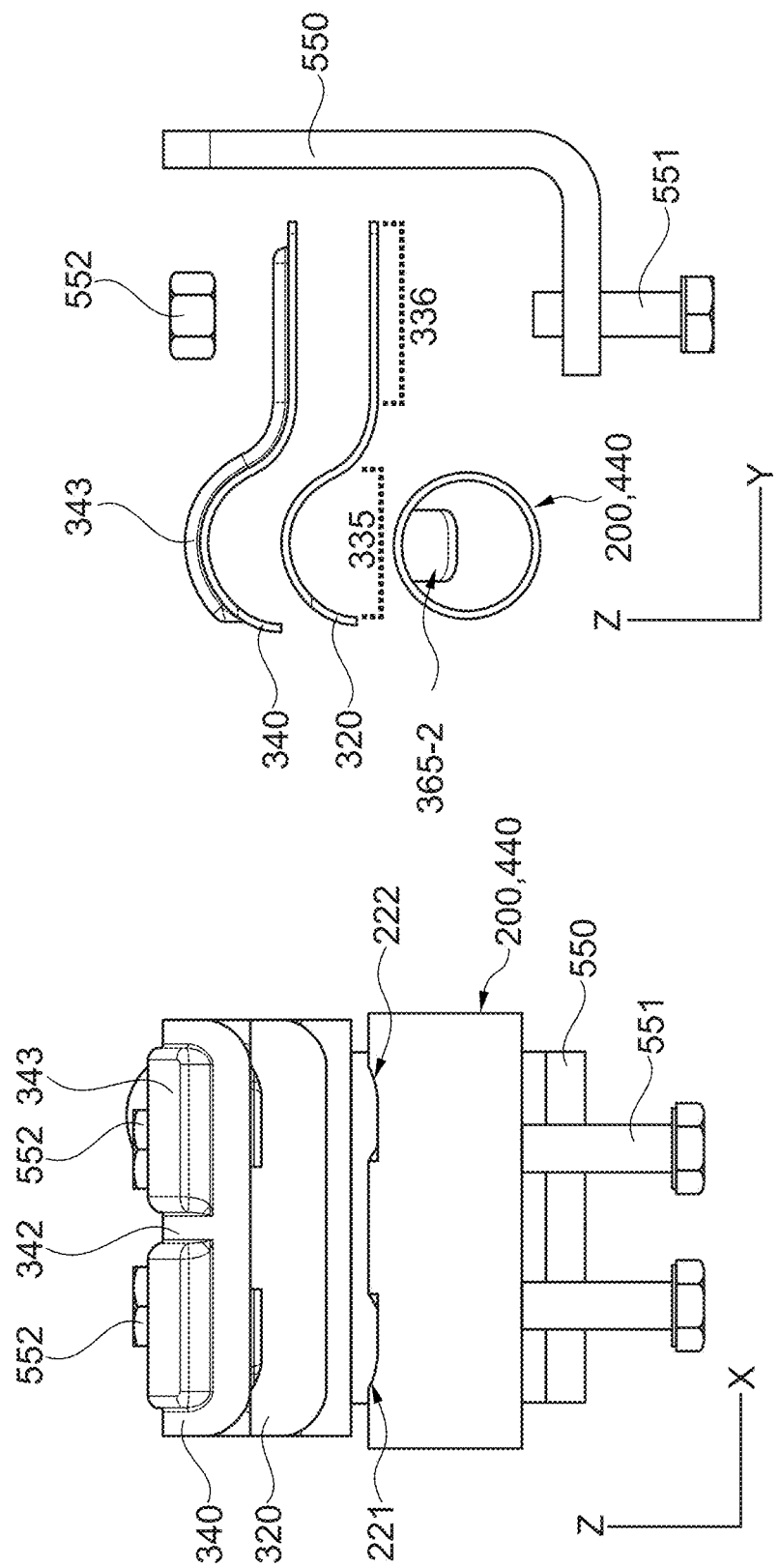

FIGS. 3C and 3D show exploded views of the connector 300, electrical terminal 550, conductor 200, bolts 551 and nuts 552 of FIGS. 3A and 3B. The outlet 362 in the lower plate 320 is visible in FIG. 3C. The openings 221 and 222 in the conductor 200 are visible in FIGS. 3C and 3D. As will be appreciated, the bolts 551 are threaded and the connector 300 can be securely attached or fixed to the terminal 550 using the bolts 551 and nuts 552.

The coolant 450 is circulated by a pump, the conductor 200/coolant pipe 440 are connected in a fluid circuit, and the one or more connectors 300 is also on that common fluid circuit. The pressure of the coolant in the fluid circuit and the pump provides for the circulation and flow of the coolant through the conduit 360 and through the coolant pipe 440. The arrangement of the specification provides for direct fluid cooling of the conductor 200 and further provides for direct fluid cooling of the connector clamps 300, during operation.

Referring to FIG. 4A, an exemplary power distribution system 500 including the power cable assembly 100, 200, 300 and an integrated cooling system 400 is described. The power cable assembly 100, 200, 300 is coupled to the cooling system 400.

Figure 4:
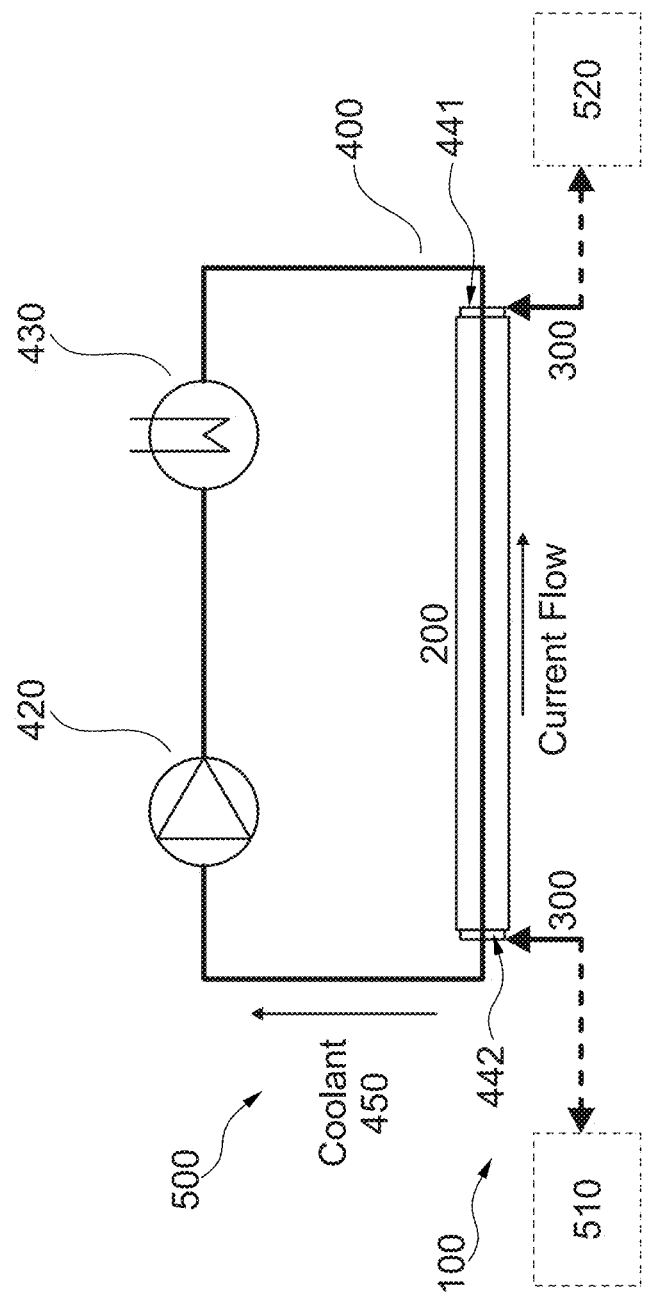
FIG. 4 is a block diagram illustrating an exemplary power cable assembly according to FIG. 1, 2, or 3 coupled to an exemplary cooling system according to embodiments of the present disclosure.

The cooling system 400 of FIG. 4 includes a pump 420 and a cooling unit 430. The power cable assembly 100 including the conductor 200. The coolant pipe 440 includes a coolant inlet 441 and the coolant outlet 442. One or more connectors 443, 444 are provided for coupling of the conductor 200 to the cooling system 400. In operation, the coolant, preferably a dielectric coolant 450, is circulated through the interior channel 225 of the conductor 200 of the power cable assembly, between the coolant inlet 441 and the coolant outlet 442. As described above connectors 300 are provided for coupling the conductor to between electrical terminals. The coolant is also circulated through the connectors 300. The coolant is circulated through a conduit 360 of each connector 300.

In the exemplary arrangement of FIG. 4, the coolant inlet 441 and coolant outlet 442 are located at opposite ends of the power cable assembly 100. It is however, appreciated that in an alternative arrangement the inlet and outlet may be located at the same end, the first end of the power cable assembly—in such an arrangement a U-bend or connector or other coolant flow return feature would be provided at the second end of the power cable assembly. In the exemplary arrangement the coolant may include a dielectric coolant.

The cooling system 400 includes a closed loop coolant circulation system. The coolant 450 is circulated by the pump 420 through the interior channel 225 of the electrical conductor 200 which defines the coolant pipe 440, between the inlet 441 and outlet 442 and via the cooling unit 430. The dielectric coolant 450 may be circulated in direct contact with the conductor 200 and with the connector 300. The cooling system 400 is configured for coupling to the coolant inlet 441 and the coolant outlet 442 using one or more connectors.

The power distribution system 500 includes an integrated cooling system 400. The arrangement defines an internal cooling system. The power cable assembly is connectable to a cooling system and operable with an integrated cooling system.

In an exemplary arrangement, the power distribution system and the power cable assembly are configured for connection between a power supply 510 and a battery 520. As described above the first and second end contact surfaces 205 of the conductor 200 of the power cable are configured for coupling via first and second connectors 300 to a node of an electrical power supply at a first end and a battery at a second end, respectively. The contact surfaces 205 of the electrical conductor 200 are conducting end surfaces at the first and second ends of the power cable assembly. Similarly, the interior channel 225 through which the coolant 450 is circulated, is configured for coupling to the cooling system 400 via one or more connectors. The coolant inlet 441 and outlet 442 are thus coupled to the cooling unit 430 and pump 420 and to the power cable assembly.

The power distribution system 500 in effect includes an electrical conducting channel and a coolant flow or circulation channel, arranged in parallel.

During operation of the power distribution system 500, as current flows through the power cable assembly 100, the electrical conductor 200 and the connectors 300, heat will be generated.

The dielectric coolant 450 is circulated through the conductor 200, to absorb heat therefrom by heat transfer to the dielectric coolant. The circulation of the dielectric coolant 200 in direct contact with the conductor advantageously avoids current leakage and provides for an improved heat transfer from the conductor to the coolant 450 and an improved cooling.

In accordance with the system 100, 200 and 300 described above, the coolant 450 is also circulated via connectors 300 for coupling the conductor 200 to the power distribution system 500. Therefore, the advantages of cooling are also provided to the connectors.

In the power cable assembly 100, connectors 300 are coupled to the conductor of the power cable. While not shown in the drawings which focus on the conducting features, the arrangement is provided with an external insulation which surrounds assembly including the connectors and the conductor. The power cable assembly includes a fluid cooled conductor. The connectors 300 of arrangement of the specification provide fluid cooled clamps.

The connector 300 with integrated cooling system according to the specification allows in exemplary arrangements for operating temperature rise (temperature above ambient temperature) to be maintained in the range in an exemplary arrangement of below around 50 degrees Celsius and dependent on conductor cross section and current loads. Current loads, in an exemplary arrangement, in the range of 100-1000 A, or even higher, may be applied.

In testing, some examples of the application and operation of arrangements according to the present specification in comparison with the prior art were considered. In existing arrangements, a temperature rise of over 50 degrees Celsius may occur. In one exemplary arrangement according to the claims, including the liquid cooled clamps, a temperature rise of around 35 degrees Celsius (around 15 degrees Celsius lower than in currently used solutions) was noted, when the same current is applied.

Operation of the power assembly according to the present specification was found in testing with cooling provided to the conductor and to the clamp to provide an improvement in cooling and reduced operating temperatures.

Example 1

Based on the arrangements of the specification, an example of a system according to the specification is described. In the example arrangement, the electrical current load provided may be in the range of 600 to 1000 A. The clamp 300 and terminal connection 550 may be formed of copper. The bolt 551 or other fixing may be of steel. The fixing is used to connect the connector or clamp to a terminal connector for supply of current to the connector and via the connector to the conductor. The busbar 200 or conductor 200 may be included of Aluminum. A coolant volume flow rate in the range of 1 to 2 litres per minute may be provided to the coolant pipe 440. Any suitable coolant for example a dielectric coolant including a NOVEC 3M dielectric coolant may be used and provided at an initial temperature of 20° C. As an example of dimensions and scale, a clamp of the prior art may have a depth of the other of 4 mm from lower surface to upper surface. The clamp 300 of the present specification may be of similar dimensions in depth.

The further features of the power assembly 100 of the present specification provides in addition to fluid or liquid-cooled cables, for delivery of cooling to the portions where the cables are connected to the conductor. The places where the cables are connected have been identified as points susceptible to overheating due to increased connection resistance. Despite an efficient system of cooling the conductor the connectors may be a critical point of the system due to heating.

The provision of connectors or clamps according to the present specification provide advantages and are directed to addressing heating. The invention provides for a connector or clamp having a conduit for coupling to a coolant pipe system. By the arrangement of the connector having two parts which are profiled to form recesses and fixed together to form the conduit allows for efficient use of the surfaces of the interior of the connector to dissipate heat from the clamp and to provide further protection against overheating. To provide for the delivery of coolant into and through the conduit, the coolant pipe and the connector both include features which work together to direct the flow of coolant through the clamp. In particular, in one arrangement two openings are provided in the liquid-cooled conductor wall. Vanes or flanges may be located at the opening to assist in diverting coolant to the conduit of the connector.

According to arrangement of the specification, the profiled clamp or connector, may be formed by welding the two elements thereof namely the upper plate 340 and the lower plate 320 together. In arrangements of the specification the connector may then be soldered to the cooling/power cable; with the opening in alignment. The current/cooling cable allows the coolant to flow through the clamp and the arrangement advantageously provides for a maximum use of the cooling surface and the use of welds as a contact point with the current connection.

In previous arrangements a clamp may typically be formed of a single, profiled flat bar that is welded to the current/cooling conductor. The arrangement of the clamp 300 of the specification, in contrast advantageously provides a two-part clamp formed for the location of an integral conduit within the clamp body to allow cooling of the clamp. The additional cooling prevents overheating of critical points such as power connections.

The power cable assembly 100 may for example be used in applications including the delivery of power from a power supply to provide charging of a battery of a car. The high voltage power cable assembly 100 may be a flexible cable.

The power cable assembly 100 includes a high voltage, HV, power cable. The power cable assembly 100 is configured for delivery of high current loads. The electrical conductor 200 is a high voltage, HV, conductor.

The electrical conductor 200 is included of a metal material. The metal may include for example: copper, ETP copper, or a copper alloy. In an alternative arrangement the metal may include aluminum or an aluminum alloy. However, it will be appreciated that other suitable alternative materials may be used. As noted above the connector may include copper. However, it will be appreciated that other suitable alternative materials may be used.

While in the drawings, the conductor 200 and the connector 300 are illustrated to show the connection of the conducting portions, it will be appreciated that the conductor and connector as provided for use one or more layers of insulation and may further include a shielding layer. For example, the power cable assembly 100 may in an arrangement of the specification includes: a first insulating layer surrounding the external surface 220 of the conductor 200; a shielding layer surrounding the first insulating layer; a second insulating layer external to the first shielding layer. In an alternative embodiment, the power cable assembly may include a first insulating layer surrounding the external surface 220 of the electrical conductor 200. The power cable assembly 100 may provide the connector integrally coupled to the conductor. In such an arrangement, insulation may be arranged around the conductor and connector, as described above.

The coolant 450 has dielectric properties and accordingly is configured to be used and circulated in direct contact with the electrical conductor 200 to be cooled. The dielectric coolant 450 may include a dielectric liquid. In a preferred arrangement, the dielectric coolant is a fully dielectric liquid. In preferred arrangements of the specification, the dielectric coolant may include, for example, one of the following:

3M FLUORINERT FC-43 or 3M NOVEC 7500
a transformer oil; or
another liquid coolant with dielectric properties However, it will be appreciated that the above dielectric coolants are provided as examples of suitable dielectric coolants for use in the arrangement of the specification, and that other suitable coolants may also be used.

The arrangements of the specification and claims advantageously provide improved heat exchange between the dielectric coolant and the conductor as the coolant is provided in direct contact with the heat transfer surface of the conductor. The improved heat exchange for cooling provides improved conductivity and further that the cross section of the conductor may be decreased in comparison with typical HV conductors, HV busbars or HV cable cross-sections.

The arrangements of specification are advantageously configured for use and operation across a wide range of current loads for example from 100 A to 1000 A, or even higher, the form, structure and dimensions of the power cable assembly may be adjusted as required for load and to provide the required thermal response levels.

Depending on the aim or particular applications, different solutions may be provided according to arrangements of the specification, for example:

Example 1—aim: decrease cost→for current 500 A may be used decreased cross section 10-25 mm$^2$; and
Example 2—aim: increase charging power→for 1000 A, 35-50 mm$^2$ conduit may be used.

The power cable assembly of arrangements of the specification is configured for coupling to a cooling system. In a further arrangement, for and in operation, the power cable assembly may be coupled to a cooling system.

Many other embodiments and modifications within the spirit and scope of the claims will be apparent to those of skill in the art upon reviewing the above description. The scope of the invention should, therefore, be determined with reference to the following claims, along with the full scope of equivalents to which such claims are entitled.

As used herein, 'one or more' includes a function being performed by one element, a function being performed by more than one element, e.g., in a distributed fashion, several functions being performed by one element, several functions being performed by several elements, or any combination of the above.

It will also be understood that, although the terms first, second, etc. are, in some instances, used herein to describe various elements, these elements should not be limited by these terms. These terms are only used to distinguish one element from another. For example, a first contact could be termed a second contact, and, similarly, a second contact could be termed a first contact, without departing from the scope of the various described embodiments. The first contact and the second contact are both contacts, but they are not the same contact.

The terminology used in the description of the various described embodiments herein is for the purpose of describing embodiments only and is not intended to be limiting. As used in the description of the various described embodiments and the appended claims, the singular forms "a", "an" and "the" are intended to include the plural forms as well, unless the context clearly indicates otherwise. It will also be understood that the term "and/or" as used herein refers to and encompasses all possible combinations of one or more of the associated listed items. It will be further understood that the terms "includes", "including", "includes", and/or "including," when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

Additionally, while terms of ordinance or orientation may be used herein these elements should not be limited by these terms. All terms of ordinance or orientation, unless stated otherwise, are used for purposes distinguishing one element from another, and do not denote any order of arrangement, order of operations, direction or orientation unless stated otherwise.

The invention claimed is:

1. An electrical connector for connecting a high voltage power cable comprising an electrical conductor to an electrical terminal, the electrical connector comprising:
    a conducting body for conduction of electricity between the electrical terminal and the electrical conductor of the high voltage power cable, and for conduction of heat from the connector to a heat transfer surface and a coolant, the conducting body comprising:
        a terminal connection portion configured for connection to an electrical terminal connector of the electrical terminal,
        a conductor connection portion having a conductor interface surface of the connector configured for engagement of the connector to the electrical conductor to provide an electrical connection between the electrical terminal and the electrical conductor, wherein the conductor connection portion is integrally formed with the terminal connection portion, and
        a conduit formed between an inlet opening and an outlet opening, the conduit defining a path for circulation of a coolant through the connector, the conduit being configured to receive the coolant from a cooling system pipe, wherein the connector comprises a heat transfer surface configured to be in contact with the coolant circulating through the conduit for transferring heat from the connector to the coolant;
    a first plate portion having an external surface and an opposing internal surface; and
    a second plate portion having an external surface and an opposing internal surface, the first and second plate portions being connected at the internal surfaces thereof to form the conducting body of the connector and one or both of the first and the second internal surfaces comprising one or more recesses which form the conduit between the first and second plate portions when the internal surfaces are connected, such that a portion of internal surface of each of the first and second plates define the heat transfer surface of the electrical connector.

2. The electrical connector according to claim 1, wherein the inlet opening and the outlet opening are located on an external surface of the connector.

3. The electrical connector according to claim 1, wherein the connector is configured for coupling the inlet opening and the outlet opening of the conduit at openings in the cooling system pipe such that the conduit of the connector is arranged in parallel with an interior channel of the cooling system pipe and wherein the coolant circulated through the interior channel of the cooling system pipe is circulated in parallel through the conduit of the connector.

4. The electrical connector according to claim 1, wherein the external surface of the first plate portion defines, in use, an external conductor facing surface of the connector and wherein the second plate portion comprises one or more of the recesses.

5. The electrical connector according to claim 1, wherein the conductor connection portion comprises a conductor interface surface configured for clamping to the electrical conductor and wherein the conductor interface surface defines a mating surface for clamping to a corresponding mating surface of the conductor.

6. The electrical connector according to claim 1, wherein the electrical terminal connection portion comprises a port and an electrical terminal connector contact surface, wherein the port is configured for connection of the electrical terminal connector to the connector such that the electrical terminal connector contact surface is arranged in electrical contact with the electrical terminal connector for conduction of electricity between the connector and the terminal.

7. The electrical connector according to claim 1, wherein the inlet opening and the outlet opening of the conduit are configured for alignment respectively with a flow opening and a return opening of the cooling system pipe for circulation of the coolant through the conduit.

8. The electrical connector according to claim 1, wherein the inlet opening and outlet opening of the conduit are formed in the conductor interface surface which, in use, is coupled to the electrical conductor.

9. The electrical connector according to claim 1, wherein a configuration of the connector is selected from a list consisting of:
    (i) the connector is formed of a metal material configured to conduct electricity and heat;
    (ii) the connector is formed of a metal material;
    (iii) the connector is formed of copper, electrolytic tough-pitch copper, or a copper alloy; and
    (iv) the connector is formed of aluminum or an aluminum alloy.

10. A high voltage power cable assembly comprising:
an electrical conductor extending longitudinally between first and second end contact surfaces configured for coupling to respective electrical connections via first and second connectors, wherein the electrical conductor has an internal surface and an external surface and a conducting body therebetween, wherein the internal surface defines an interior channel between a first end opening and a second end opening configured for receiving a coolant from a cooling system arranged in communication with the conductor, wherein each contact surface of the conductor further comprises a flow opening and a return opening; and
one or more electrical connectors according to claim 1, wherein the conductor interface surface of the electrical connector is configured to be attached at a corresponding contact surface of the conductor to provide an electrical connection between the electrical conductor and an electrical terminal, wherein the electrical connector and electrical conductor are configured such that when connected, the inlet opening and outlet opening of the conduit of the electrical connector are engaged with the flow opening and return opening respectively of the conductor, and wherein the conduit is configured to receive the coolant from the cooling system in communication with the electrical conductor.

11. The high voltage power cable assembly according to claim 10, wherein the electrical connector and the electrical conductor are configured such that the coolant circulated by the cooling system is circulated in parallel through the electrical conductor and through the conduit.

12. The high voltage power cable assembly according to claim 10, wherein a configuration of the electrical conductor is selected from a list consisting of:
(i) the electrical conductor has a tubular form,
(ii) the electrical conductor has a cylindrical form,
(iii) the electrical conductor comprises a busbar, and
(iv) the electrical conductor defines a cooling system pipe arranged to receive the coolant from the cooling system.

* * * * *